(No Model.)

H. W. LIBBEY.
APPARATUS FOR INFLATING BICYCLE TIRES.

No. 581,076. Patented Apr. 20, 1897.

Witnesses.
Laura E. Hayward
Caleb H. Swan

Inventor.
Hosea W. Libbey
by Edwin Plant
attorney.

UNITED STATES PATENT OFFICE.

HOSEA W. LIBBEY, OF BOSTON, MASSACHUSETTS.

APPARATUS FOR INFLATING BICYCLE-TIRES.

SPECIFICATION forming part of Letters Patent No. 581,076, dated April 20, 1897.

Application filed May 15, 1896. Serial No. 591,636. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Apparatus for Inflating Bicycle-Tires, of which the following, taken in connection with the accompanying drawings, is a specification.

The object of my invention is to provide a means whereby a pneumatic tire of a bicycle-wheel can readily be filled at any time, thus avoiding the inconvenience of the rider carrying a pump.

The invention consists in permanently attaching to the nipple of the tire an air-pump, the piston-rod of which is held in a raised position by means of a spring or springs, so that to force air into the tire a person has only to make a series of depressions upon said piston-rod, the same being returned to its raised or normal position by said spring or springs, as hereinafter described, and pointed out in the claim.

Figure 1:
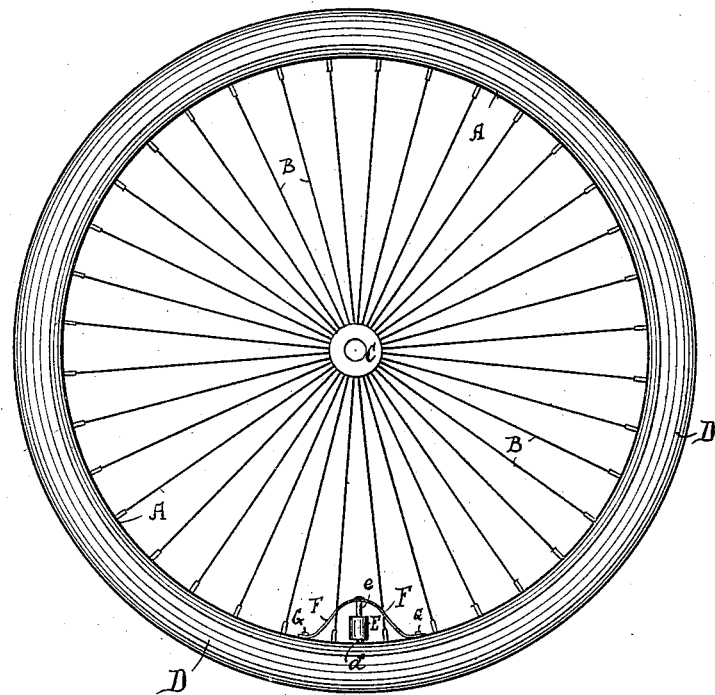
Figure 2:
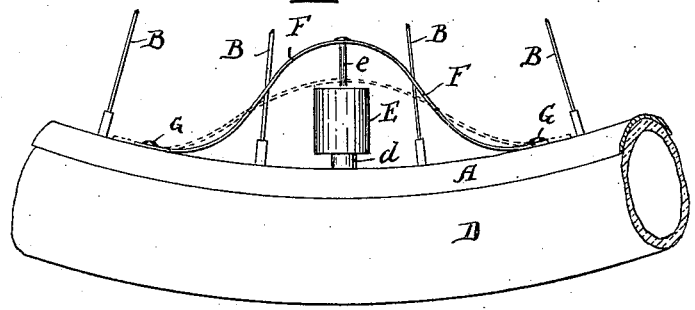
Figure 3:
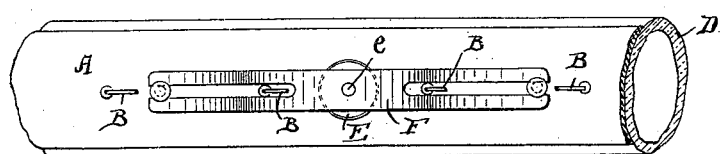

Referring to the accompanying drawings, Figure 1 represents a side view of a wheel having an inflated tire with an air-filling device embodying my invention attached thereto. Fig. 2 is an enlarged view of a portion of same, and Fig. 3 is a plan or top view.

A represents the rim of a bicycle-wheel, B the spokes, C the hub, and D the pneumatic tire, all of which may be of ordinary construction.

E is an air-pump secured to the nipple $d$ of the pneumatic tire. This nipple is of metal and is rigid, so that there will not be any side motion.

F is a flat spring secured at its center to the piston-rod $e$ of the pump E. This spring is slotted at each end, so as to pass the spokes B on each side of said air-pump, and the ends are held to (but so that they can slide freely on) the rim A by means of headed pins or studs G, that pass through the slots in the ends of the spring F.

It will be seen that by this construction the air-pump E is always in position ready to be operated, the spring F raising the piston-rod and piston, so that should any air leak out of the tire D all that the operator has to do is to depress the central portion of the spring F by his hand or toe, and by making a number of such depressions air will be forced into the tire until it is of the desired tension, the piston-rod and piston being each time drawn up by the spring F.

What I claim is—

In combination with a wheel having a pneumatic tire an air-pump rigidly secured to the nipple of said tire and a flat spring secured at its center to the piston-rod of the pump, the outer ends of said spring being slotted and bearing upon the inner portion of the wheel-rim and studs for holding the outer ends of the spring in place substantially as set forth.

In testimony whereof I have signed my name to this specification, in the presence of two subscribing witnesses, on this 2d day of May, A. D. 1896.

HOSEA W. LIBBEY.

Witnesses:
CALEB H. SWAN,
EDWIN PLANTA.